United States Patent
Koops et al.

(10) Patent No.: US 9,436,005 B2
(45) Date of Patent: Sep. 6, 2016

(54) AMPLIFIED PIEZOELECTRIC CAMERA LENS CLEANER

(71) Applicant: Gentex Corporation, Zeeland, MI (US)

(72) Inventors: Luke W. Koops, Zeeland, MI (US); Kristopher R. Green, Allendale, MI (US)

(73) Assignee: GENTEX CORPORATION, Zeeland, MI (US)

( * ) Notice: Subject to any disclaimer, the term of this patent is extended or adjusted under 35 U.S.C. 154(b) by 217 days.

(21) Appl. No.: 13/957,734

(22) Filed: Aug. 2, 2013

(65) Prior Publication Data
US 2014/0033454 A1  Feb. 6, 2014

Related U.S. Application Data

(60) Provisional application No. 61/678,903, filed on Aug. 2, 2012.

(51) Int. Cl.
*G02B 27/00* (2006.01)

(52) U.S. Cl.
CPC .................. *G02B 27/0006* (2013.01)

(58) Field of Classification Search
CPC G02B 23/16; G02B 27/0006; G02B 27/006; B60R 2300/10–2300/108; B08B 7/20; B08B 7/02; B08B 11/00
USPC .............................. 359/507–512; 15/94, 246
See application file for complete search history.

(56) References Cited

U.S. PATENT DOCUMENTS

| | | |
|---|---|---|
| 1,153,945 A | 9/1915 | Mustin |
| 1,304,548 A | 5/1919 | Normanville |
| 2,298,063 A | 10/1942 | MacPherson |
| 3,659,307 A | 5/1972 | Vitou |
| 3,736,617 A | 6/1973 | Ahlen |
| 3,942,863 A | 3/1976 | Schuwerk |
| 4,187,868 A | 2/1980 | Rudolphi |
| 4,367,426 A | 1/1983 | Kumada et al. |
| 4,410,563 A | 10/1983 | Richter et al. |
| 4,414,576 A | 11/1983 | Randmae |
| 4,699,478 A | 10/1987 | Tsui et al. |
| 4,701,659 A | 10/1987 | Fujii et al. |

(Continued)

FOREIGN PATENT DOCUMENTS

| | | |
|---|---|---|
| DE | 3638983 | 5/1988 |
| EP | 1227683 | 7/2002 |
| EP | 1529688 | 5/2005 |
| JP | 57124238 | 8/1982 |
| JP | 6310973 | 11/1994 |

(Continued)

OTHER PUBLICATIONS

The International Search Report and Written Opinion of the International Searching Aurhority, or the Declaration, Pages: All, Date: Jun. 28, 2012.

*Primary Examiner* — Darryl J Collins
*Assistant Examiner* — Journey Sumlar
(74) *Attorney, Agent, or Firm* — Price Heneveld LLP; Scott P. Ryan

(57) ABSTRACT

A lens cleaning device includes a piezoelectric member including a first side, a second side, and a central aperture. The piezoelectric member is operably coupled to a power source. A resilient member includes an inner edge and an outer edge. One of the inner edge and the outer edge of the resilient member is operably coupled to the first side of the piezoelectric member. A lens is operably coupled to the other of the inner edge and the outer edge of the resilient member.

16 Claims, 4 Drawing Sheets

(56) References Cited

U.S. PATENT DOCUMENTS

| | | |
|---|---|---|
| 4,768,256 A | 9/1988 | Motoda |
| 4,929,072 A | 5/1990 | Fujie et al. |
| 4,985,719 A | 1/1991 | Tsurukawa et al. |
| 5,007,722 A | 4/1991 | Mori et al. |
| 5,012,593 A | 5/1991 | Okada et al. |
| 5,013,888 A | 5/1991 | Okada et al. |
| 5,025,187 A | 6/1991 | Fujie et al. |
| 5,068,770 A | 11/1991 | Baziuk |
| 5,114,740 A | 5/1992 | Plate et al. |
| 5,121,200 A | 6/1992 | Choi |
| 5,132,840 A | 7/1992 | Okada et al. |
| 5,136,425 A | 8/1992 | Fujie et al. |
| 5,148,312 A | 9/1992 | Kawai et al. |
| 5,155,625 A | 10/1992 | Komatsu et al. |
| 5,166,825 A | 11/1992 | Fujie et al. |
| 5,170,288 A | 12/1992 | Imaizumi et al. |
| 5,172,024 A | 12/1992 | Broussoux et al. |
| 5,177,606 A | 1/1993 | Koshizawa |
| 5,233,467 A | 8/1993 | Ogasawara |
| 5,299,060 A | 3/1994 | Mori et al. |
| 5,315,333 A | 5/1994 | Nash |
| 5,418,643 A | 5/1995 | Ogasawara et al. |
| 5,475,530 A | 12/1995 | Fujie et al. |
| 5,503,515 A | 4/1996 | Moorehead |
| 5,572,354 A | 11/1996 | Desmond et al. |
| 5,594,585 A | 1/1997 | Komatsu |
| 5,708,859 A | 1/1998 | Tajima et al. |
| 5,721,639 A | 2/1998 | Aoshima et al. |
| 5,724,186 A | 3/1998 | Collier |
| 5,761,556 A | 6/1998 | Ichino |
| 6,138,319 A | 10/2000 | Benoit |
| 6,288,845 B1 | 9/2001 | Harada |
| 6,308,628 B1 | 10/2001 | Bronstein et al. |
| 6,322,258 B1 | 11/2001 | Ryan et al. |
| 6,352,758 B1 | 3/2002 | Huang et al. |
| 6,587,573 B1 | 7/2003 | Stam et al. |
| 6,607,606 B2 | 8/2003 | Bronson |
| 6,619,806 B2 | 9/2003 | Akami et al. |
| 6,648,477 B2 | 11/2003 | Hutzel et al. |
| 6,678,045 B2 | 1/2004 | Rettig et al. |
| 6,731,867 B1 | 5/2004 | Sherwin |
| 6,782,182 B2 | 8/2004 | Dautartas et al. |
| 6,816,297 B1 | 11/2004 | Tonar et al. |
| 6,836,292 B2 | 12/2004 | Bean et al. |
| 6,911,997 B1 | 6/2005 | Okamoto et al. |
| 6,917,693 B1 | 7/2005 | Kiridena et al. |
| 6,996,338 B2 | 2/2006 | Sherwin |
| 7,006,129 B1 | 2/2006 | McClure |
| 7,065,227 B2 | 6/2006 | Taniguchi et al. |
| 7,078,846 B2 | 7/2006 | Tsukui et al. |
| 7,104,657 B2 | 9/2006 | Sherwin |
| 7,129,971 B2 | 10/2006 | McCutchen |
| 7,215,881 B2 | 5/2007 | Borngräber et al. |
| 7,283,303 B2 | 10/2007 | Takano et al. |
| 7,324,149 B2 | 1/2008 | Takizawa et al. |
| 7,387,454 B2 | 6/2008 | Kikuchi et al. |
| 7,486,326 B2 | 2/2009 | Ito et al. |
| 7,518,093 B2 | 4/2009 | Veerasamy et al. |
| 7,579,939 B2 | 8/2009 | Schofield et al. |
| 7,621,682 B2 | 11/2009 | Miyazaki et al. |
| 7,679,833 B2 | 3/2010 | Kuiper et al. |
| 7,686,524 B2 | 3/2010 | Takizawa et al. |
| 7,692,855 B2 | 4/2010 | Arrouy et al. |
| 7,726,434 B2 | 6/2010 | Pöchmüller |
| 7,727,771 B2 | 6/2010 | Chiou et al. |
| 7,763,340 B2 | 7/2010 | Sakai et al. |
| 7,810,511 B2 | 10/2010 | Fagrenius et al. |
| 7,813,639 B2 | 10/2010 | Yoneji |
| 7,881,496 B2 | 2/2011 | Camilleri et al. |
| 7,883,064 B2 | 2/2011 | Luft et al. |
| 7,965,336 B2 | 6/2011 | Bingle et al. |
| 8,007,901 B2 | 8/2011 | Beinat et al. |
| 8,009,979 B2 | 8/2011 | Shirono |
| 8,011,837 B2 | 9/2011 | Kawai |
| 8,031,224 B2 | 10/2011 | Linsenmaier et al. |
| 8,041,208 B2 | 10/2011 | Seita |
| 8,044,776 B2 | 10/2011 | Schofield et al. |
| 8,049,640 B2 | 11/2011 | Uken et al. |
| 8,075,143 B2 | 12/2011 | Fujimoto |
| 8,077,406 B2 | 12/2011 | Hachitani et al. |
| 8,118,501 B2 | 2/2012 | Buschmann |
| 8,120,653 B2 | 2/2012 | Schmidt et al. |
| 8,199,200 B2 | 6/2012 | Kawai et al. |
| 8,243,184 B2 | 8/2012 | Kawai |
| 8,246,183 B2 | 8/2012 | Kulas et al. |
| 8,258,219 B2 | 9/2012 | Shimada et al. |
| 8,289,617 B2 | 10/2012 | Yamada et al. |
| 8,339,526 B2 | 12/2012 | Minikey, Jr. et al. |
| 8,514,316 B2 | 8/2013 | Okazaki et al. |
| 8,562,154 B2 | 10/2013 | Ohashi |
| 2001/0048557 A1 | 12/2001 | Akami et al. |
| 2002/0001394 A1 | 1/2002 | Taniguchi et al. |
| 2002/0139394 A1 | 10/2002 | Bronson |
| 2002/0152573 A1 | 10/2002 | Tsukui et al. |
| 2002/0180880 A1 | 12/2002 | Bean et al. |
| 2003/0214588 A1 | 11/2003 | Takizawa et al. |
| 2004/0169761 A1 | 9/2004 | Kawai et al. |
| 2004/0183941 A1 | 9/2004 | McCutchen |
| 2005/0275738 A1 | 12/2005 | Arai |
| 2006/0023131 A1 | 2/2006 | Takano et al. |
| 2006/0171704 A1 | 8/2006 | Bingle et al. |
| 2006/0193069 A1 | 8/2006 | Miyazaki et al. |
| 2006/0232670 A1 | 10/2006 | Chu |
| 2007/0007284 A1 | 1/2007 | Veerasamy et al. |
| 2007/0132610 A1 | 6/2007 | Guernalec et al. |
| 2007/0153385 A1 | 7/2007 | Sakai et al. |
| 2007/0166522 A1 | 7/2007 | Beinat et al. |
| 2007/0205674 A1 | 9/2007 | Tseng et al. |
| 2007/0223899 A1 | 9/2007 | Snow |
| 2007/0243110 A1 | 10/2007 | Chiou et al. |
| 2007/0261711 A1 | 11/2007 | Fagrenius et al. |
| 2008/0002260 A1 | 1/2008 | Arrouy et al. |
| 2008/0068520 A1 | 3/2008 | Minikey, Jr. et al. |
| 2008/0088702 A1 | 4/2008 | Linsenmaier et al. |
| 2008/0204890 A1 | 8/2008 | Kuiper et al. |
| 2008/0213853 A1 | 9/2008 | Garcia et al. |
| 2008/0231972 A1 | 9/2008 | Hachitani et al. |
| 2008/0259200 A1* | 10/2008 | Matsumoto ............... B08B 7/02 348/340 |
| 2009/0002807 A1 | 1/2009 | Hendriks et al. |
| 2009/0009857 A1 | 1/2009 | Yamada et al. |
| 2009/0011243 A1 | 1/2009 | Yamada et al. |
| 2009/0169196 A1 | 7/2009 | Seita |
| 2009/0257123 A1 | 10/2009 | Okazaki et al. |
| 2010/0033818 A1 | 2/2010 | Petcavich et al. |
| 2010/0034530 A1* | 2/2010 | Son ................... 396/427 |
| 2010/0234489 A1 | 9/2010 | Shimada et al. |
| 2010/0325825 A1 | 12/2010 | Kawai |
| 2011/0005030 A1 | 1/2011 | Shirono |
| 2011/0033663 A1 | 2/2011 | Svec et al. |
| 2011/0073142 A1 | 3/2011 | Hattori et al. |
| 2011/0120494 A1 | 5/2011 | Ifuku et al. |
| 2011/0228389 A1 | 9/2011 | Ohashi |
| 2011/0242667 A1 | 10/2011 | Kulas et al. |
| 2011/0249120 A1 | 10/2011 | Bingle et al. |
| 2011/0266375 A1 | 11/2011 | Ono et al. |
| 2011/0292212 A1 | 12/2011 | Tanabe et al. |
| 2011/0308381 A1 | 12/2011 | Hartley |
| 2012/0000024 A1 | 1/2012 | Layton |
| 2012/0243093 A1* | 9/2012 | Tonar ............... G02B 27/0006 359/507 |

FOREIGN PATENT DOCUMENTS

| | | |
|---|---|---|
| JP | 8107327 | 4/1996 |
| JP | 2004015604 | 1/2004 |
| JP | 2007028195 | 2/2007 |
| JP | 3941598 | 7/2007 |
| WO | 2011014497 | 2/2011 |
| WO | WO 2011052973 A2 * | 5/2011 |

* cited by examiner

AMPLIFIED PIEZOELECTRIC CAMERA LENS CLEANER

CROSS-REFERENCE TO RELATED APPLICATIONS

This application claims priority to and the benefit under 35 U.S.C. §119(e) of U.S. Provisional Patent Application No. 61/678,903, filed on Aug. 2, 2012, entitled, "AMPLIFIED PIEZOELECTRIC CAMERA LENS CLEANER", the entire disclosure of which is incorporated herein by reference.

BACKGROUND OF THE INVENTION

The present invention generally relates to a lens cleaning device, and more specifically to an amplified piezoelectric camera lens cleaner.

SUMMARY OF THE PRESENT INVENTION

One aspect of the present invention includes a lens cleaning device having a piezoelectric member including a first side, a second side, and a central aperture. The piezoelectric member is operably coupled to a power source. A resilient member includes an inner edge and an outer edge. One of the inner edge and the outer edge of the resilient member is operably coupled to the first side of the piezoelectric member. A lens is operably coupled to the other of the inner edge and the outer edge of the resilient member.

Another aspect of the present invention includes a lens cleaning device having a piezoelectric member including a first side, a second side, and a central aperture. The piezoelectric member is operably coupled to a power source. A resilient member includes an inner edge and an outer edge. The inner edge of the resilient member is operably coupled to the second side of the piezoelectric member. A lens is operably coupled to the first side of the piezoelectric member.

Another aspect of the present invention includes a lens cleaning device having a piezoelectric member including a first side, a second side, and a central aperture. The piezoelectric member is operably coupled to a power source. A first resilient member includes a proximal end and a distal end. The distal end of the first resilient member is operably coupled to the second side of the piezoelectric member. A second resilient member includes a proximal end and a distal end. The proximal end of the second resilient member is operably coupled to the first side of the piezoelectric member. A lens is operably coupled to the distal end of the second resilient member.

These and other aspects, objects, and features of the present invention will be understood and appreciated by those skilled in the art upon studying the following specification, claims, and appended drawings.

DETAILED DESCRIPTION OF EMBODIMENTS

Figure 1:
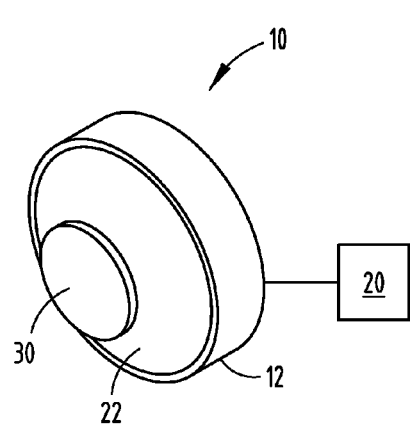
FIG. 1 is a top perspective view of one embodiment of a lens cleaning device of the present invention.
Figure 3:
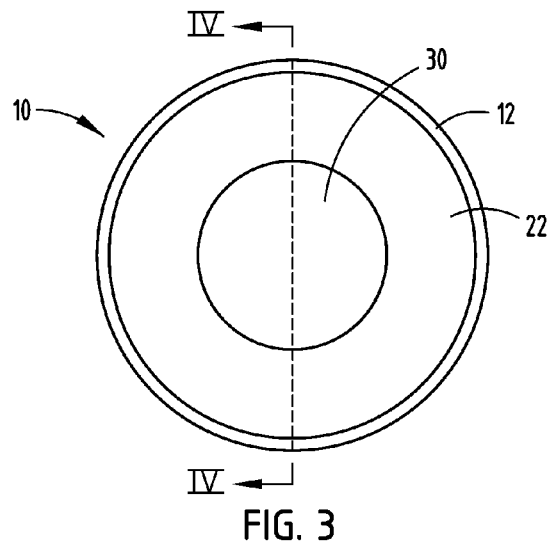
FIG. 3 is a front elevational view of the lens cleaning device of FIG. 1.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The embodiments described herein relate to a device for cleaning a lens. Lens cleaning devices are generally known and examples of such devices are described in U.S. patent application Ser. No. 13/428,799, entitled "Lens Cleaning Apparatus," U.S. patent application Ser. No. 13/557,070, entitled "Imaging Device Protector and Cleaner," and U.S. Provisional Application Ser. No. 61/785,654, entitled "Light Sensing Device," all of which are hereby incorporated by reference in their entirety.

Reference will now be made in detail to the present embodiments, examples of which are illustrated in the accompanying drawings. Wherever possible, the same reference numerals will be used throughout the drawings to refer to the same or like parts. In the drawings, the depicted structural elements are not to scale and certain components are enlarged relative to other components for purposes of emphasis and understanding.

Referring to FIGS. 1-4, reference numeral 10 generally designates a lens cleaning device having a piezoelectric member 12, which includes a first side 14, a second side 16, and a central aperture 18, and is operably coupled to a power source 20. The lens cleaning device 10 also includes a resilient member 22 having an inner edge 24 and an outer edge 26. In the illustrated embodiment, the outer edge 26 of the resilient member 22 includes a larger diameter than the inner edge 24 of the resilient member 22. The outer edge 26 of the resilient member 22 is operably coupled to the first side 14 of the piezoelectric member 12 and the inner edge 24 of the resilient member 22 is operably coupled to a lens 30.

Referring again to FIGS. 1-4, the piezoelectric member 12 is generally cylindrical and operable to vibrate upon activation of the power source 20. The piezoelectric member 12 can be formed from any of a variety of materials that are configured to vibrate when a sufficient power source 20 coupled with the piezoelectric member 12 is activated. It is contemplated that the piezoelectric member 12 may have any of a variety of diameters and may also include varying wall thicknesses. The piezoelectric member 12 includes an outer circumferential wall 31 and an inner circumferential wall 32. The outer edge 26 of the resilient member 22 is disposed at a proximal end of the resilient member 22 and is configured to abut the first side 14 of the piezoelectric member 12. The inner edge 24 of the resilient member 22 is disposed at a distal end of the resilient member 22 and is configured to abut the lens 30.

Figure 2:
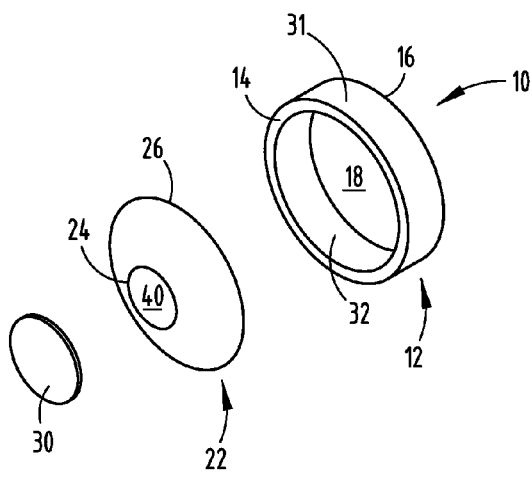
FIG. 2 is a top perspective exploded view of the lens cleaning device of FIG. 1.
Figure 4:
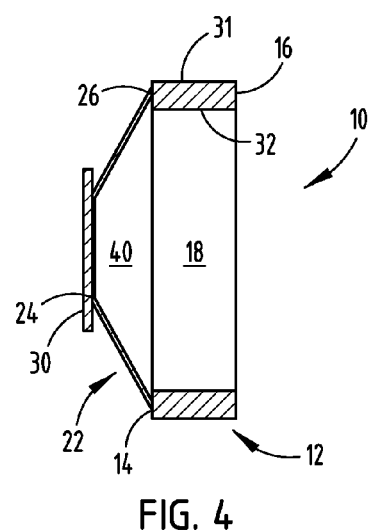
FIG. 4 is a side cross-sectional view taken at line IV-IV of FIG. 3.
Figure 5:
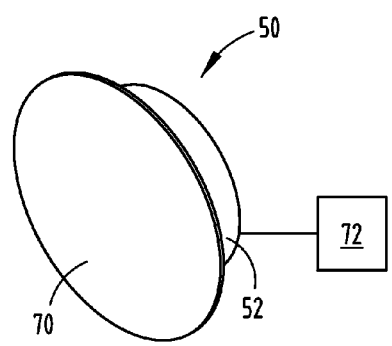
FIG. 5 is a top perspective view of another embodiment of a lens cleaning device of the present invention.
Figure 7:
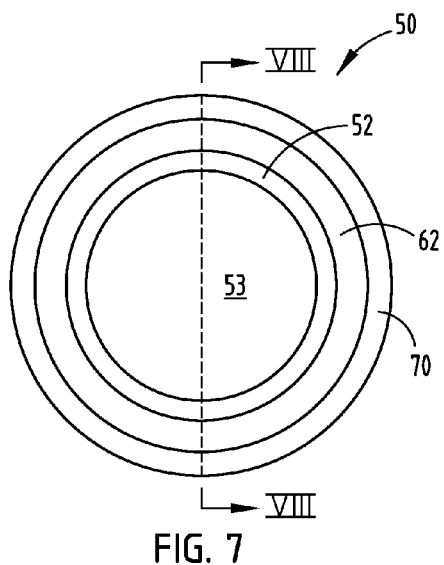
FIG. 7 is a rear elevational view of the lens cleaning device of FIG. 5.

The resilient member 22, as illustrated in FIGS. 2 and 4, includes a conical frustum shape. However, it is also contemplated that the resilient member 22 could include a partially spherical shape, with walls of the resilient member 22 arched inwardly or outwardly relative to a center of mass of the resilient member 22. As illustrated in FIG. 4, the lens 30 has a larger diameter than an inner aperture 40 defined by the inner edge 24 of the resilient member 22. However, it is also contemplated that the lens 30 may have a smaller diameter or a diameter of the same size as the inner aperture 40 defined by the resilient member 22.

The resilient member 22 generally acts as a spring that amplifies or enhances the effects of the piezoelectric member 12 when the piezoelectric member 12 is activated. The effects of the amplification by the resilient member 22 are exhibited on the lens 30. Accordingly, more energy is delivered to the lens 30 as a result of the vibratory motion of the piezoelectric member 12 and the lens 30 has increased ability to atomize water droplets and/or other matter that may form on the lens 30. The resilient member 22 may be connected with the piezoelectric member 12 and the lens 30 by way of an adhesive or other connecting material that secures the lens 30 to the resilient member 22, and the resilient member 22 to the piezoelectric member 12.

Referring now to FIGS. 5-8, another embodiment of a lens cleaning device 50 includes a piezoelectric member 52 having a substantially cylindrical construction defining a central aperture 53. The piezoelectric member 52 includes a first side 54 and a second side 56, as well as an outer circumferential wall 58 and an inner circumferential wall 60. The lens cleaning device 50 also includes a resilient member 62 having an inner edge 64 at a proximal end thereof and an outer edge 66 at a distal end thereof.

In the illustrated embodiment, the inner edge 64 defines an inner aperture 68 of the resilient member 62. The inner edge 64 is operably coupled with the first side 54 of the piezoelectric member 52 and the outer edge 66 is operably coupled with a lens 70. Because the outer edge 66 of the resilient member 62 includes a greater diameter than the inner edge 64 of the resilient member 62, the lens 70 includes a larger diameter than the piezoelectric member 52.

Figure 6:
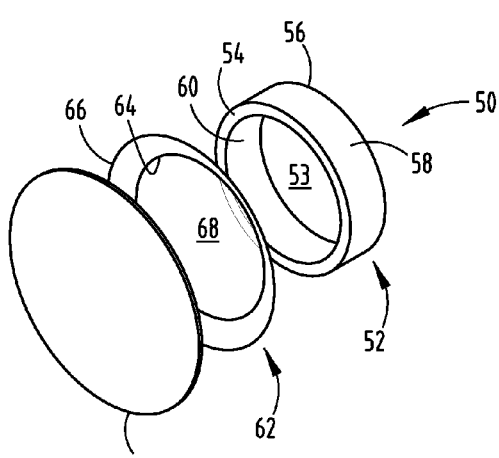
FIG. 6 is a top perspective exploded view of the lens cleaning device of FIG. 5.
Figure 8:
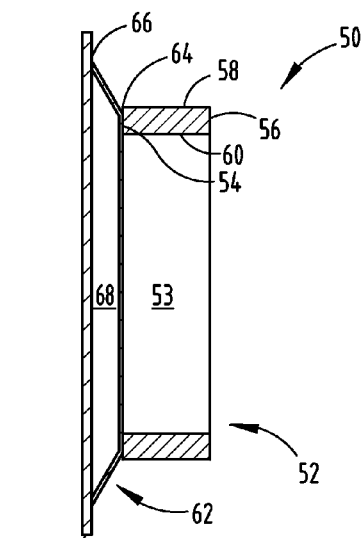
FIG. 8 is a side cross-sectional view taken at line VIII-VIII of FIG. 7.
Figure 9:
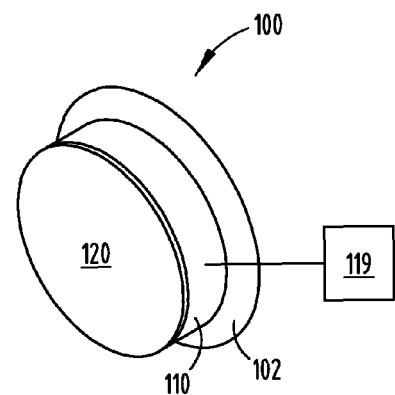
FIG. 9 is a top perspective view of another embodiment of a lens cleaning device of the present invention.
Figure 11:
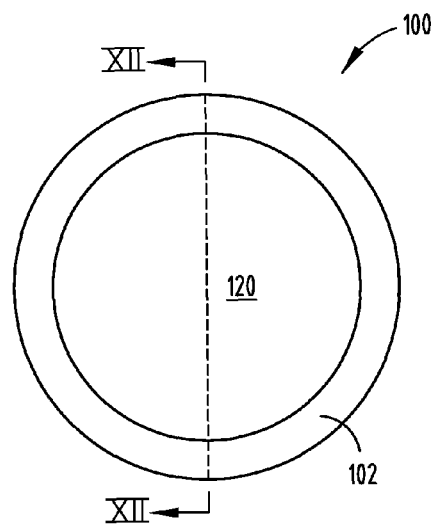
FIG. 11 is a front elevational view of the lens cleaning device of FIG. 9.

As shown in FIGS. 6 and 8, the lens 70 extends past the outer edge 66 of the resilient member 62 and has a larger diameter than the inner aperture 68 of the resilient member 62. However, it is also contemplated that the lens 70 may include the same diameter or a smaller diameter as the outer edge 66 of the resilient member 62. Activation of a power source 72 that is operably coupled to the piezoelectric member 52 results in the piezoelectric member 52 vibrating.

As with the previous embodiment, the resilient member 62 amplifies the effects of the vibration on the lens 70, which results in increased movement of the lens 70. Increased movement of the lens 70 results in a higher atomization rate than would otherwise be possible if the lens 70 was directly in contact with the piezoelectric member 52. The resilient member 62 may be connected with the piezoelectric member 52 and the lens 70 by way of an adhesive or other connecting material that secures the lens 70 to the resilient member 62, and the resilient member 62 to the piezoelectric member 52.

Referring now to FIGS. 9-12, a lens cleaning device 100 includes a resilient member 102 having a proximal end with an outer edge 104 and a distal end with an inner edge 106 defining an inner aperture 108. In the illustrated embodiment, the outer edge 104 of the resilient member 102 includes a larger diameter than the inner edge 106 of the resilient member 102. A piezoelectric member 110 is operably coupled with the inner edge 106 of the resilient member 102 and defines a central aperture 109. The piezoelectric member 110 includes a first side 112, a second side 114, an inner circumferential wall 116, and an outer circumferential wall 118. The piezoelectric member 110 is connected on the first side 112 to a lens 120 and on the second side 114 to the inner edge 106 of the resilient member 102.

Figure 10:
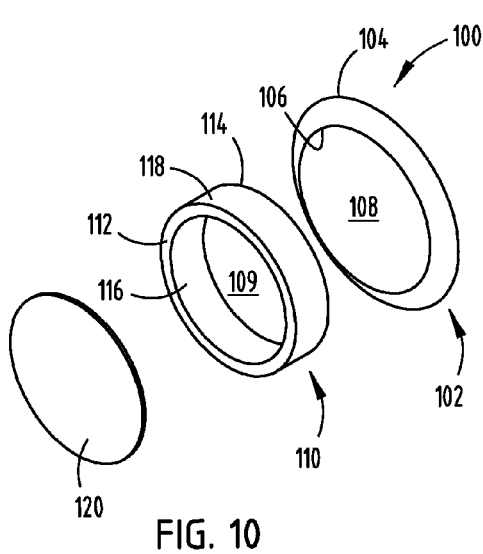
FIG. 10 is a top perspective exploded view of the lens cleaning device of FIG. 9.
Figure 12:
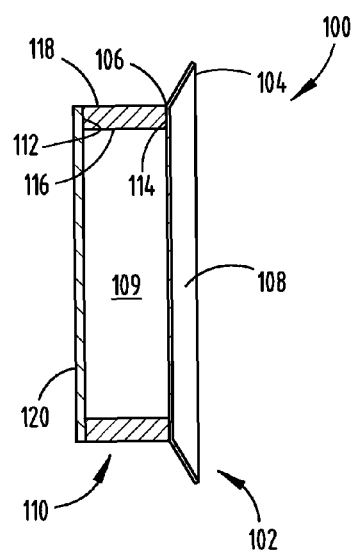
FIG. 12 is a side cross-sectional view taken at line XII-XII of FIG. 11.
Figure 13:
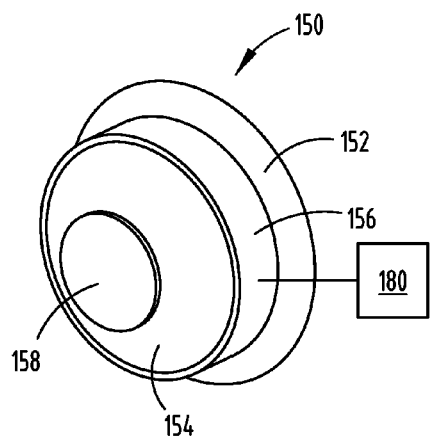
FIG. 13 is a top perspective view of another embodiment of a lens cleaning device of the present invention.
Figure 15:
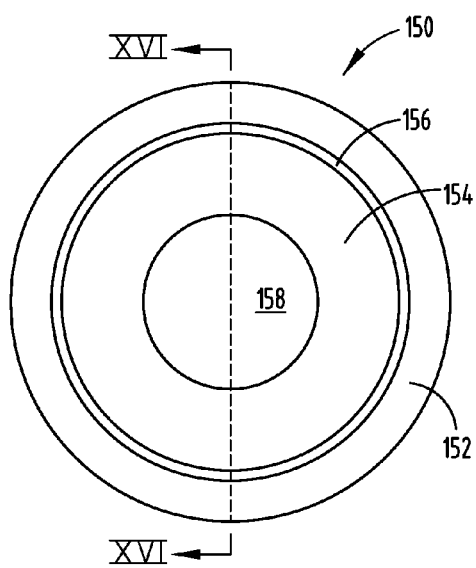
FIG. 15 is a front elevational view of the lens cleaning device of FIG. 13.

The lens 120, as depicted in FIGS. 10 and 12, includes a diameter that is substantially equal to the diameter of the outer circumferential wall 118. However, it is also contemplated that the lens 120 may have a diameter that is smaller than or larger than the diameter of the outer circumferential wall 118. Activation of a power source 119 that is operably coupled to the piezoelectric member 110 results in the piezoelectric member 110 vibrating.

As with the previous embodiments, the resilient member 102 amplifies the effects of the vibration on the lens 120, which results in increased movement of the lens 120. Increased movement of the lens 120 results in a higher atomization rate than would otherwise be possible if the lens 120 was directly in contact with the piezoelectric member 110 in the absence of the resilient member. The piezoelectric member 110 may be connected with the resilient member 102 and the lens 120 by way of an adhesive or other connecting material that secures the lens 120 to the piezoelectric member 110, and the piezoelectric member 110 to the resilient member 102.

Referring now to FIGS. 13-16, yet another embodiment of a lens cleaning device 150 includes a first resilient member 152, a second resilient member 154, a piezoelectric member 156, and a lens 158. The first resilient member 152 includes a proximal end with an outer edge 160 and a distal end with an inner edge 162 that defines an inner aperture 164 of the first resilient member 152. The piezoelectric member 156 includes a first side 166, a second side 168, an inner circumferential wall 170, and an outer circumferential wall 172. Also, the piezoelectric member 156 defines a central aperture 173. The second side 168 of the piezoelectric member 156 is operably coupled to the inner edge 162 of the distal end of the first resilient member 152. The first side 166 of the piezoelectric member 156 is connected to an outer edge 174 of the proximal end of the second resilient member 154. The second resilient member 154 also includes a distal end with an inner edge 176, which is operably coupled to the lens 158 and defines an inner aperture 178.

Figure 14:
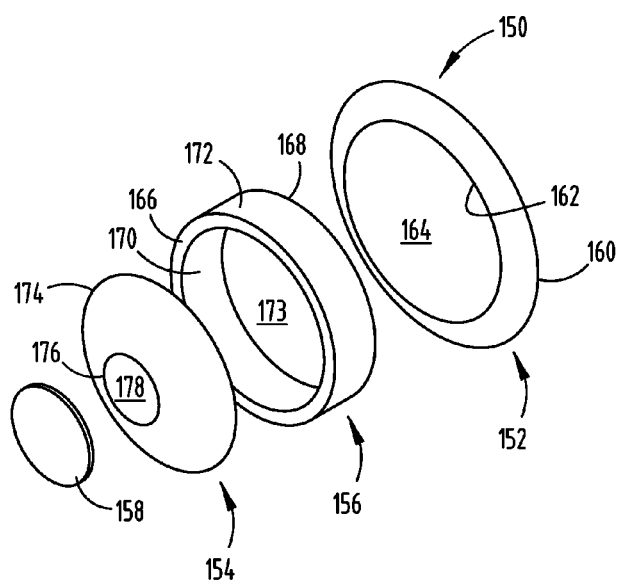
FIG. 14 is a top perspective exploded view of the lens cleaning device of FIG. 13.
Figure 16:
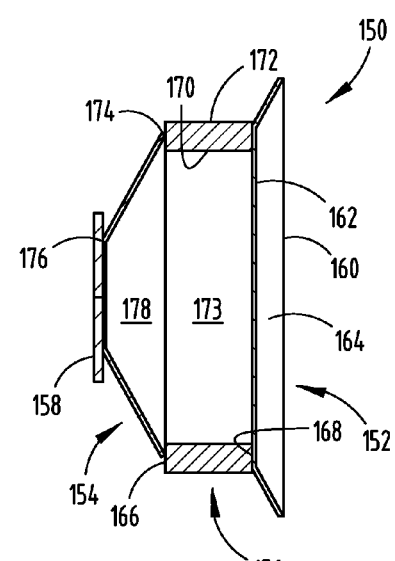
FIG. 16 is a side cross-sectional view taken at line XVI-XVI of FIG. 15.

As illustrated in FIGS. 14 and 16, the outer edge 160 of the first resilient member 152 has a larger diameter than the inner edge 162 of the first resilient member 152. Similarly, the outer edge 174 of the second resilient member 154 has a larger diameter than the inner edge 176 of the second resilient member 154. As further shown in FIGS. 14 and 16, the lens 158 includes a larger diameter than that of the inner edge 176 of the second resilient member 154. However, it is also contemplated that the lens 158 may be smaller than or the same size as the inner aperture 178 defined by the second resilient member 154. In an alternative embodiment, the second resilient member 154 and the lens 158 may adopt the configuration of the resilient member 62 and lens 70 shown in FIGS. 6 and 8, and may be adapted to the piezoelectric member 156 in the same manner in which resilient member 62 and lens 70 is adapted to piezoelectric member 52, as previously described. In either embodiment, upon activation of a power source 180 that is operably coupled to the piezoelectric member 156, the piezoelectric member 156 vibrates.

The vibratory motion of the piezoelectric member 156 is amplified by the spring-like effects of the first and second resilient members 152, 154, which effects are exhibited on the lens 158. Accordingly, the lens 158 has increased ability to atomize water droplets and/or other matter that may form on the lens 158. The lens 158, first and second resilient members 152, 154, and the piezoelectric member 110 may be connected by way of an adhesive or other connecting material that secures the lens 158 to the second resilient member 154, the second resilient member 154 to the piezoelectric member 156, and the piezoelectric member 156 to the first resilient member 152.

With respect to each of the embodiments disclosed herein, it is contemplated that each of the embodiments may be used in applications such as, but not limited to, wide view or narrow view applications. It is also contemplated that the resilient members may include partially arcuate, linear, spherical, etc. shapes. Additionally, it is contemplated that the piezoelectric member may include shapes other than that of a cylinder, including a square, a rectangle, an ellipse, etc. With respect to the power source, it will be understood that the power source may include, but is not limited to, AC voltage, AC voltage with varying frequencies, DC voltage, etc.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A lens cleaning device comprising:
   a piezoelectric member having a first side, a second side, and a central aperture, the piezoelectric member being operably coupled to a power source and operable to vibrate upon activation of the power source;
   a resilient member having an inner edge and an outer edge, wherein one of the inner edge and the outer edge of the resilient member is operably coupled to the first side of the piezoelectric member; and
   a lens operably coupled to the other of the inner edge and the outer edge of the resilient member, the lens being capable of moving as a result of the vibratory motion of the piezoelectric member;
   wherein the resilient member amplifies the vibrational effects of the piezoelectric member, which results in increased movement of the lens and an increased rate in which matter formed on the lens is atomized.

2. The lens cleaning device of claim 1, wherein the piezoelectric member includes a substantially cylindrical construction.

3. The lens cleaning device of claim 1, wherein the resilient member includes a conical frustum shape.

4. The lens cleaning device of claim 3, wherein the outer edge of the resilient member has a larger diameter than the inner edge of the resilient member.

5. The lens cleaning device of claim 4, wherein the lens has a larger diameter than an inner aperture defined by the inner edge.

6. The lens cleaning device of claim 1, wherein the resilient member includes a spherical shape.

7. A lens cleaning device comprising:
   a piezoelectric member having a first side, a second side, and a central aperture, the piezoelectric member being operably coupled to a power source and operable to vibrate upon activation of the power source;

a resilient member having a conical frustum shape and including an inner and outer edge, wherein the inner edge of the resilient member is operably coupled to the second side of the piezoelectric member; and a lens operably coupled to the first side of the piezoelectric member, the lens being capable of moving as a result of the vibratory motion of the piezoelectric member.

8. The lens cleaning device of claim 7, wherein the piezoelectric member includes a substantially cylindrical construction.

9. The lens cleaning device of claim 8, wherein the piezoelectric member further includes an inner circumferential wall and an outer circumferential wall, and the lens has substantially the same diameter as the outer circumferential wall.

10. The lens cleaning device of claim 7, wherein the resilient member amplifies the vibrational effects of the piezoelectric member, which results in increased movement of the lens and an increased rate in which matter formed on the lens is atomized.

11. A lens cleaning device comprising:

a piezoelectric member having a first side, a second side, and a central aperture, the piezoelectric member being operably coupled to a power source and operable to vibrate upon activation of the power source;

a first resilient member having a proximal end and a distal end, wherein the distal end of the first resilient member is operably coupled to the second side of the piezoelectric member;

a second resilient member having one of a conical frustum shape and a spherical shape, the second resilient member including a proximal end and a distal end, wherein the proximal end of the second resilient member is operably coupled to the first side of the piezoelectric member; and a lens operably coupled to the distal end of the second resilient member, the lens being capable of moving as a result of the vibratory motion of the piezoelectric member.

12. The lens cleaning device of claim 11, wherein the piezoelectric member includes a substantially cylindrical construction.

13. The lens cleaning device of claim 11, wherein the piezoelectric member is operable to vibrate upon activation of the power source and the first and second resilient members amplify the vibrational effects of the piezoelectric member, which results in increased movement of the lens and an increased rate in which matter formed on the lens is atomized.

14. The lens cleaning device of claim 11, wherein the second resilient member further includes an inner edge located at one of the proximal end and the distal end of the resilient member and an outer edge located at the other of the proximal end and the distal end of the resilient member.

15. The lens cleaning device of claim 14, wherein the outer edge of the second resilient member has a larger diameter than the inner edge of the second resilient member.

16. The lens cleaning device of claim 15, wherein the lens has a larger diameter than an inner aperture defined by the inner edge of the second resilient member.

* * * * *